US012795343B2

(12) United States Patent
Cyril

(10) Patent No.: US 12,795,343 B2
(45) Date of Patent: Nov. 10, 2026

(54) TECHNIQUES FOR MAINTAINING CELLULAR ACCESS DURING IMPACT EVENTS

(71) Applicant: T-Mobile USA, Inc., Bellevue, WA (US)

(72) Inventor: Henry Cyril, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 202 days.

(21) Appl. No.: 18/912,281

(22) Filed: Oct. 10, 2024

(65) Prior Publication Data

US 2026/0107122 A1 Apr. 16, 2026

(51) Int. Cl.

| | |
|---|---|
| ***H04W 4/90*** | (2018.01) |
| ***H04M 15/00*** | (2024.01) |
| ***H04W 4/02*** | (2018.01) |
| ***H04W 4/24*** | (2024.01) |
| ***H04W 4/50*** | (2018.01) |
| ***H04W 24/04*** | (2009.01) |

(52) U.S. Cl.
CPC ............. *H04W 4/90* (2018.02); *H04M 15/86* (2013.01); *H04W 4/023* (2013.01); *H04W 4/24* (2013.01); *H04W 4/50* (2018.02); *H04W 24/04* (2013.01)

(58) Field of Classification Search
CPC ......... H04W 4/90; H04W 4/24; H04W 76/50; H04W 24/04; H04W 4/02; H04W 4/16; H04W 12/082; H04W 4/00; H04W 4/021; H04W 4/023; H04W 4/029; H04W 4/06; H04W 48/02; H04W 48/18; H04M 15/854; H04M 15/86; H04M 2242/04; H04M 1/72463; H04M 15/41; H04M 15/82; H04M 17/10; H04M 17/00
See application file for complete search history.

(56) References Cited

U.S. PATENT DOCUMENTS

2007/0060100 A1* 3/2007 Watler .................. H04W 12/06 455/406
2021/0021702 A1* 1/2021 Gudivada ............ G06Q 20/102
2025/0048399 A1* 2/2025 Loffe .................... H04W 72/30

* cited by examiner

*Primary Examiner* — Lester G Kincaid
(74) *Attorney, Agent, or Firm* — Lee & Hayes, P.C.

(57) ABSTRACT

Techniques are described herein for providing, by a network provisioning engine node, techniques for automating suppression of deactivation notifications for user equipment that is impacted by an impact event. In embodiments, such techniques may comprise receiving an indication of an impact event that affects a geographic region, identifying a set of gateway devices associated with the geographic region, and determining a set of impacted user equipment based on the set of gateway devices. Such techniques may further involve receiving a deactivation request related to a user equipment and upon determining that the user equipment is in the set of impacted user equipment, suppressing the deactivation request. In the techniques upon determining that the user equipment is not in the set of impacted user equipment, the network provisioning engine node may forward the deactivation request to core nodes of the network.

20 Claims, 7 Drawing Sheets

TECHNIQUES FOR MAINTAINING CELLULAR ACCESS DURING IMPACT EVENTS

BACKGROUND

Currently, cellular technology has advanced to its fifth generation (5G). Cellular networks are frequently used to enable communication between various mobile devices. In a cellular network (such as the Global System for Mobile communication (GSM) and TETRA (TErrestrial Trunked RAdio)), a geographical region is divided into a number of cells, each of which is served by a base station (also referred to as a Base Transceiver Station (BTS)). Such cellular networks are typically made up of a number of base stations that are geographically distributed throughout the geographical region in a way that maximizes wireless transmission coverage for the cellular network.

When an impact event occurs that negatively affects people in a geographic region, some users of a cellular network may have difficulty meeting obligations associated with their cellular account. An impact event may be any event during which one or more capabilities are limited for people within the geographic region. For example, when a natural disaster (such as a hurricane or an earthquake) strikes a region, the people in that region may be unable to travel or access online resources to pay for cellular service. By way of illustration, prepaid customers may be unable to access a physical location in order to purchase additional service. This can be problematic at a time during which maintaining cellular service is most critical.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
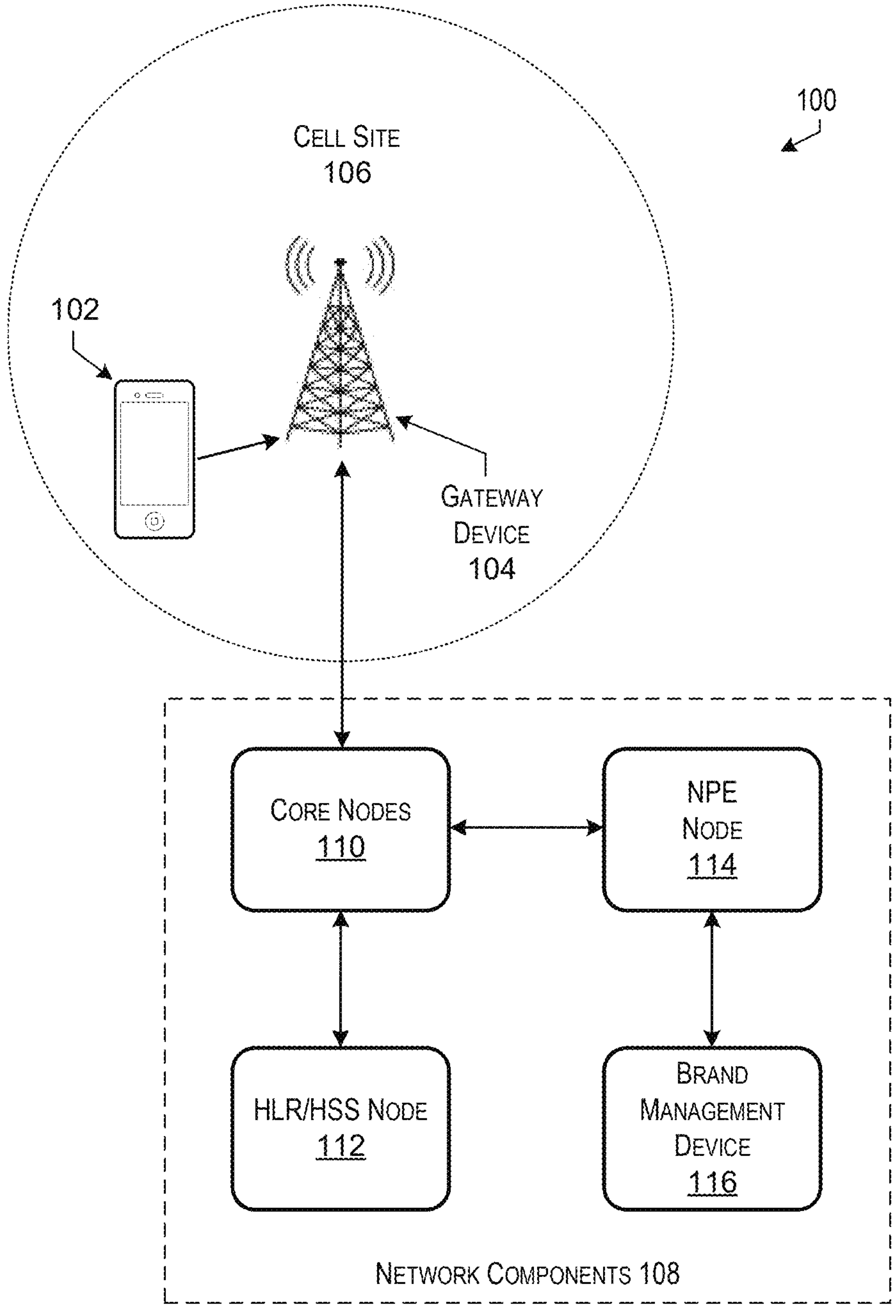
FIG. 1 is a block diagram that illustrates a wireless telecommunication network architecture 100 in which aspects of the disclosed technology may be implemented in accordance with embodiments.

This disclosure describes techniques that may be performed to enable automatic (e.g., without human interaction) suppression of deactivation notifications in relation to user equipment that has been impacted by an impact event. In embodiments, information about an impact event may be obtained that includes at least an indication of an area or region within which people's capabilities may be limited. For example, an impact event may cause mobility to be limited within an area and/or may cause resources (such as the Internet) to become unavailable in the area.

In the disclosed techniques, a number of gateway devices (e.g., base stations) may be determined to be associated with the geographic region impacted by the impact event. More particularly, a number of gateway devices may be determined to be located within or proximate to the geographic region. Once a list of gateway devices have been identified, a number of user equipment may then be determined to be impacted by the impact event based on interactions between those user equipment and the gateway devices in the list of gateway devices.

In operation, a node operating on a network may receive a deactivation request. As described elsewhere, the network may provide network services on behalf of a number of different brand entities that manage subscriber accounts. A deactivation request may be received from one of these brand entities when services to an associated user equipment are to be ceased. For example, the network may be operated by a mobile network operator (MNO), and the different brand entities may be mobile virtual network operators (MVNOs) that sell or resell mobile telecommunication services under their brands using the network of the MNO. In another example, the different brand entities may include the MNO and one or more MVNOs.

Upon receiving a deactivation request as noted above, the node may initially check to determine if the user equipment is one that has been impacted by an impact event. In some cases, this may involve checking a flag value associated with the user equipment. In other cases, this may involve determining if an identifier associated with the user equipment is included on a list of user equipment previously identified as being impacted by the impact event. Provided that the user equipment is determined to be impacted by the impact event, the deactivation request may be suppressed. In contrast, if the user equipment is determined not to be impacted by the impact event, the deactivation request may be forwarded to one or more core nodes to stop services from being provided to the user equipment.

Embodiments of the disclosure provide for a number of advantages over conventional systems. For example, embodiments of the disclosure enable a cellular provider to automatically prevent deactivation of services to user equipment that has been impacted by an impact event. Typically, deactivations are performed by a brand entity that manages accounts for user equipment but might not have information on location and usage data for the user equipment. When subscribers are unable to access resources (e.g., to pay a bill or to drive to a location to refill "prepaid minutes"), their accounts may become delinquent (in some cases because of the impact event) and the brand entities may subsequently request deactivation of those delinquent accounts. This deactivation may occur at a time that the subscriber most needs the services to be canceled, which can be problematic. Accordingly, the disclosure allows for networks to prevent deactivation of cellular services during impact events, enabling subscribers to continue to use needed services during emergencies.

FIG. 1 is a block diagram that illustrates a wireless telecommunication network architecture 100 in which aspects of the disclosed technology may be implemented in accordance with embodiments. The architecture 100 includes at least one user equipment 102 that is capable of communicating with one or more networks via respective access points (e.g., gateway device 104) that each manage connectivity for a respective cell site 106.

In the architecture 100, a user equipment 102 may be in communication with a network (e.g., a cellular network) via a gateway device 104. Such a network may include a number of network components 108, which comprise various node devices each performing predetermined functions. Notably, the network components 108 may include at least a number of core nodes 110 each capable of performing core functionality for the network. Additionally, the network components 108 may include a Home Subscriber Server (HSS)/Home Subscriber Register (HLR) node (e.g., HLR/HSS node 112) that serves as the primary database/repository of subscriber information for the environment.

The network components 108 may further include a Network Provisioning Engine (NPE) node 114 configured to relay information/instructions between the network components and various entities known as "brands." In such cases, the NPE node 114 may be in communication with one or more brand management device 116 configured to manage operations within the network on behalf of a specific brand entity.

A gateway device 104 may be any suitable electronic device that is capable of managing access to one or more networks. In some embodiments, the gateway device 104 may be, or may be implemented within, a base station. A base station is a type of network NPE node (NAN) that can also be referred to as a cell site (e.g., cell site 106), a base transceiver station, or a radio base station. In some embodiments, the gateway device 104 may include one or more radio access units that provide service (e.g., cellular data service) to a user equipment 102 within a geographic area surrounding the gateway device 104 (e.g., a cell). The network architecture 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point. In some embodiments, a group of neighboring base stations/gateway devices 104 may be managed by a base station controller (not shown).

A gateway device 104 implemented as a base station may include one or more transmission mechanisms (e.g., a radio transceiver) capable of enabling wireless communication with a number of user equipment. Such base stations may be distributed over an area in a sufficiently dense manner such that multiple user equipment (e.g., mobile communication devices) in communication with the network can communicate with each other or with a terrestrial network. In some embodiments, the gateway device 104 may include one or more sensors configured to collect information about the gateway device 104 itself or an environment in which the gateway device 104 is situated. Additionally, the gateway device 104 may include one or more mechanical means of adjusting/configuring components of the gateway device. For example, the gateway device may include a radio antenna as well as a motorized mechanism for adjusting a position of the radio antenna.

A gateway device 104 implemented as a base station can wirelessly communicate with multiple user equipment 102 within wireless communication range via one or more base station antennas. The architecture 100 can include base stations of different types (e.g., macro and/or small cell base stations). In some implementations, there can be overlapping geographic coverage areas (e.g., cells) for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.). In some embodiments, the network may operate using a fixed wireless access (FWA) connection. FWA is a type of 5G or 4G LTE wireless technology that enables fixed broadband access using radio frequencies rather than cables.

The user equipment 102 can correspond to or include devices capable of communication using various connectivity standards. For example, a 5G communication channel can use millimeter wave (mmW) access frequencies of 28 GHz or more. In some implementations, a user equipment 102 can operatively couple to a gateway device 104 over a long-term evolution/long-term evolution-advanced (LTE/LTE-A) communication channel, which is referred to as a 4G communication channel. In some non-limiting examples, user equipment can include handheld mobile devices (e.g., smartphones, portable hotspots, tablets, etc.); laptop devices; wearable devices; drones; vehicles with wireless connectivity; head-mounted displays with wireless augmented reality/virtual reality (AR/VR) connectivity; portable gaming consoles; wireless routers, gateways, modems, and other fixed-wireless access devices; wirelessly connected sensors that provides data to a remote server over a network; IoT devices such as wirelessly connected smart home appliances, etc.

A user equipment 102 can communicate with various types of access points and network equipment at the edge of a network including macro eNBs/gNBs, small cell eNBs/gNBs, relay base stations, and the like. A user equipment can also communicate with other user equipment either within or outside the same coverage area of a base station via device-to-device (D2D) communications.

A communication link between a user equipment 102 and a gateway device 104 may include uplink (UL) transmissions from a user equipment 102 to a gateway device 104, and/or downlink (DL) transmissions from a gateway device 104 to a user equipment 102. The downlink transmissions can also be called forward link transmissions while the uplink transmissions can also be called reverse link transmissions. Each communication link includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links can transmit bidirectional communications using frequency division duplex (FDD) (e.g., using paired spectrum resources) or Time division duplex (TDD) operation (e.g., using unpaired spectrum resources). In some implementations, the communication links include LTE and/or mmW communication links.

The network architecture 100 can include a 5G network and/or an LTE/LTE-A or other network. In an LTE/LTE-A network, the term eNB may be used to describe the gateway devices 104 used in 5G new radio (NR) networks, the term gNBs may be used to describe the gateway devices 104 that can include mmW communications. The network architecture 100 can thus form a heterogeneous network in which different types of base stations provide coverage for various geographic regions. For example, each gateway device 104 can provide communication coverage for a local network that forms a macro cell, a small cell, and/or other types of cell sites. As used herein, the term "cell site" or "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by user equipment that have service subscriptions with a wireless network service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by user equipment that have service subscriptions with the network provider of architecture 100. A femto cell covers a relatively smaller geographic area (e.g., a home) and can provide restricted access by user equipment having an association with the femto unit (e.g., user equipment in a closed subscriber group (CSG), user equipment for users in the home). A base station can support one or multiple (e.g., two, three, four, and the like) cells (e.g., component carriers). All fixed transceivers noted herein that can provide access to the network are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a user equipment 102 and the gateway devices 104 or core network supporting radio bearers for the user plane data. At the Physical (PHY) layer, the transport channels are mapped to physical channels.

In operation, a user equipment 102 can connect to a network operating across the network components 108 via a gateway device 104 (e.g., a base station). The user equipment 102 may be associated with a brand entity that is different from the entity operating the network. In such cases, the core nodes 110 may provide the user equipment 102 with various functionality as dictated by a brand management device 116 that maintains an account associated with the user equipment 102. In such cases, the brand management device 116 may provide information to the core nodes 110 in relation to whether services, and what services, are available to a particular user equipment having an account with that brand management device 116. In other words, while the entity operating the core nodes of the network may provide services/functionality to a user equipment, the brand management device 116 associated with that user equipment may dictate whether those services/functionality should be provided to the user equipment.

The illustrative network architecture 100 may incorporate, by way of example, CDMA2000 based mobile wireless network components (e.g., AAA service for performing user authentication and providing user profiles) and includes data services delivered via one or more data access protocols, such as EV-DO, EV-DV or the like. Other embodiments include a wireless access network complying with one or more of LTE, WCDMA, UMTS, GSM, GPRS, EDGE, Wi-Fi (i.e., IEEE 802.11x), Wi-MAX (i.e., IEEE 802.16), or similar telecommunication standards configured to deliver voice and data services to mobile wireless end user equipment such as, a user equipment 102 depicted in FIG. 1 carrying out wireless communications via a gateway device 104. Such a mobile wireless network system may include hundreds or thousands of such base stations.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
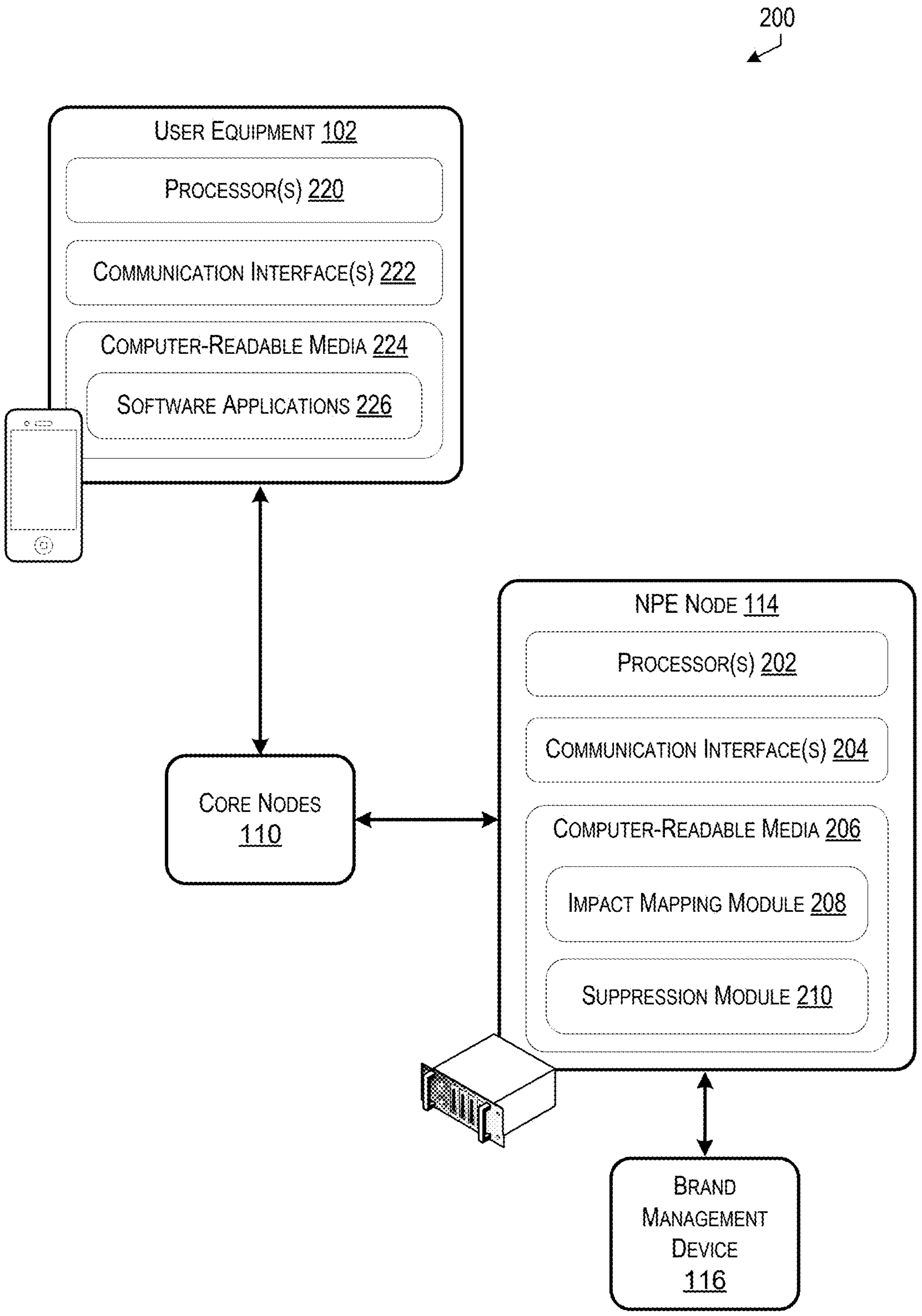
FIG. 2 depicts a component diagram of an example system that may be implemented in a network in order to enable maintaining network access in an impact event in accordance with at least some embodiments.

FIG. 2 depicts a component diagram of an example system that may be implemented in a network (e.g., a mobile network) in order to enable maintaining network access in an impact event in accordance with at least some embodiments. As depicted in FIG. 2, a user equipment 102 operated by a user may access network functionality via one or more core nodes 110. Additionally, as described elsewhere, the core nodes 110 may be further in communication with an NPE node 114 and/or other network components. The NPE node 114 may be in further communication with a number of brand management devices 116, each of which may be associated with a different brand entity operating on the network.

In some embodiments, core nodes 110 may be an example of the core nodes 110 described in relation to FIG. 1. As noted elsewhere, core nodes 110 may include any computing devices configured to perform the functions needed to support users, administrators, and applications. The user equipment 102 may access the core nodes 110 operating on a network via a gateway device. Such a gateway device may be implemented on, or in direct communication with, a base station. It should be noted that such a gateway device (or any other described computing component) may include a single computing device (e.g., a server device) or a combination of computing devices. In some cases, the gateway device may be implemented as a virtual device/system (e.g., via virtual machines implemented within a cloud computing environment).

As illustrated, the NPE node 114 may include one or more hardware processors 202 configured to execute one or more stored instructions. Such processor(s) 202 may comprise one or more processing cores. Further, the NPE node 114 may include one or more communication interfaces 204 configured to provide communications between the NPE node 114 and other devices, such as the user equipment 102 or any other suitable electronic device.

The NPE node 114 may also include computer-readable media 206 that stores various executable components (e.g., software-based components, firmware-based components, etc.). The computer-readable media 206 may store components to implement functionality described herein. While not illustrated, the computer-readable media 206 may store one or more operating systems utilized to control the operation of the one or more devices that comprise the NPE node 114. According to one instance, the operating system comprises the LINUX operating system. According to another instance, the operating system(s) comprise the WINDOWS® SERVER operating system from MICROSOFT Corporation of Redmond, Washington. According to further embodiments, the operating system(s) can comprise the UNIX operating system or one of its variants. It should be appreciated that other operating systems can also be utilized.

The computer-readable media 206 may include portions, or components, that configure the NPE node 114 to perform various operations described herein. For example, the computer-readable media 206 may include some combination of components configured to implement the described techniques. Particularly, the NPE node 114 may include a component configured to correlate user equipment to an impact event (e.g., impact mapping module 208) as well as a component configured to suppress activation/deactivation instructions (e.g., suppression module 210). Additionally, the computer-readable media 206 may further maintain one or more databases, such as a database of information maintained in relation to mappings of user equipment and cell sites/locations.

An impact mapping module 208 may be configured to, when executed by the processors 202, identify one or more user equipment that are determined to be associated with (or impacted by) an impact event. An impact event may be any event or occurrence that affects a number of people (and user equipment operated by those people) within a geographic region. Some illustrative, but nonlimiting, examples of an impact event may include a natural disaster (e.g., an earthquake, a hurricane, a flood, etc.), a terrorist attack (such as a bombing), or an outage (such as a power outage).

In embodiments, when an impact event occurs, a geographic region associated with that impact event is determined. In some cases, the geographic region may be determined based on a predetermined radius from an impact point (e.g., an epicenter). In some cases, the geographic region may be a zip code or county that includes an impact point associated with an impact event.

As noted elsewhere, a network (e.g., a cellular network) may be operated across a geographic area via cell sites that are distributed throughout that area. Each cell site may be managed by a base station, and each base station that manages a cell site may be associated with a geographic location (e.g., geographic coordinates). Upon identifying a geographic region associated with an impact event, the impact mapping module 208 may be configured to identify a number of cell sites associated with that impact event by virtue of the cell sites being located at least partially within the identified geographic region for the impact event. In other words, once a geographic region is determined as being associated with an impact event, the impact mapping module 208 may be configured to generate a list of cell sites that are located within (or in close proximity to) that determined region.

In embodiments, one or more nodes operating on a network (such as the NPE node 114) may maintain information about cell sites that are accessed by each user equipment. Such information may include an indication of which cell sites were accessed by each user equipment and at what dates/times. Such information may be maintained by one or more nodes operating on the network for some predetermined amount of time.

Once a list of cell sites has been generated in relation to an impact event that has occurred, the impact mapping module 208 may be configured to identify a number of user equipment that accessed the cell sites in the generated list at a time of, or at a time before, a time at which the impact event has occurred. In some cases, once the number of user equipment has been identified, an account associated with each respective user equipment may be flagged as being impacted by the impact event.

In some embodiments, the impact mapping module 208 may be further configured to identify accounts associated with user equipment that are no longer impacted by an impact event. In such cases, each impact event may be associated with a period of time or expiration date/time. Once that period of time has elapsed (or the expiration date has been reached), the impact mapping module 208 may be configured to unflag each of the accounts previously flagged as being impacted by the impact event. If the NPE node 114 has received a deactivation request during the period of time and has not received a reactivation request, then the impact mapping module 208 may be configured to provide instructions to the core nodes 110 to deactivate one or more services/functionality. In some cases, this may be done a predetermined amount of time after the account has been unflagged.

A suppression mapping module 210 may be configured to, when executed by the processors 202, suppress deactivation or reactivation instructions received from a brand management device 116 from being sent to the core nodes 110. When an account associated with a user equipment becomes delinquent (e.g., because an outstanding balance has not been resolved), the brand management device 116 that manages that account may typically send a notification to the core nodes 110 to cause it to cease providing services provided to that user equipment.

Upon receiving such a notification, the suppression mapping module 210 may be configured to determine whether the user equipment is currently flagged as being impacted by an impact event. In one example, the suppression mapping module 210 may retrieve a flag value associated with the user equipment. In another example, the suppression mapping module 210 may determine whether an identifier for the user equipment (e.g., a serial number, International Mobile Subscriber Identity (IMSI), Mobile Station International Subscriber Directory Number (MSISDN), or other suitable identifier) is included on a list of identifiers for user equipment that is impacted by an impact event.

If a determination is made that the user equipment associated with the notification is not currently impacted by an impact event, then the suppression module 210 may forward the notification to the core nodes 110 in order to have the services to the user equipment stopped. If a determination is made that the user equipment associated with the notification is currently impacted by an impact event, then the suppression module 210 may prevent forwarding of the notification to the core nodes 110.

The user equipment 102 may be an example of a user equipment 102 as described in relation to FIG. 1 above. As noted elsewhere, a user equipment 102 may include any suitable electronic device configured to interact with a network.

Similar to the NPE node 114, a user equipment 102 may include one or more hardware processors 220 configured to execute stored instructions. Such processor(s) 220 may comprise one or more processing cores. Further, the user equipment 102 may include one or more communication interfaces 222 configured to provide communications between the user equipment 102 and other devices, such as a gateway device or another suitable electronic device.

Similar to the NPE node 114, the user equipment 102 may also include computer-readable media 224 that stores various executable components (e.g., software-based components, firmware-based components, etc.). The computer-readable media 224 may store components to implement functionality described herein.

The computer-readable media 224 may include portions, or components, that configure the user equipment 102 to perform various operations described herein. For example, the computer-readable media 224 may include some combination of components configured to implement the described techniques. In embodiments, the computer-readable media 224 of the user equipment 102 may include one or more software application 226 configured to perform particular functions.

A software application 226 may be any suitable set of computer executable instructions that causes the user equipment to perform one or more functions. In embodiments, a software application 226 may be supported by a remote server. In other words, when executed, the software application may cause the user equipment 102 to communicate with a remote server to perform at least a portion of the functionality provided by the software application 226. The network traffic generated during such a communication may be transmitted to the gateway device to be routed to its intended destination device via core nodes 110.

In embodiments, the user equipment, upon execution of one or more software applications, is caused to establish communication with the network. In order to do so, the user equipment 102 establishes a communication session between itself and a gateway device, such as a base station. The gateway device may then route communications between the user equipment 102 (over the established communication session) and the core nodes 110 of the network. The core nodes 110 may then communicate with the user equipment as well as various application servers operating on the network in order to provide services/functionality to the user equipment 102.

Figure 3:
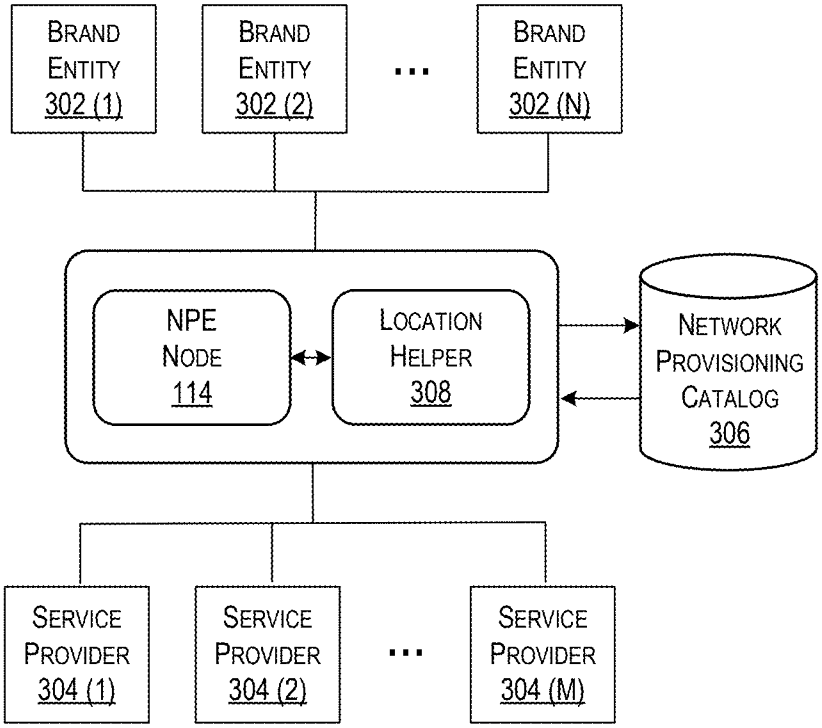
FIG. 3 depicts a block diagram illustrating interactions between various components implemented within a network in accordance with embodiments.

FIG. 3 depicts a block diagram illustrating interactions between various components implemented within a network in accordance with embodiments. As noted elsewhere, a network (e.g., a cellular network) may partner with a number of different brand entities to provide common network services to user equipment associated with those brand entities. In such cases, the brand entities are typically responsible for account management (e.g., billing the operator of the user equipment), while the operator of the core network is typically responsible for providing network services to the user equipment.

In the depicted system, the operator of the core network is often unaware of any account status changes related to a user equipment absent receiving a notification from a brand entity associated with that user equipment. On the other hand, the brand entity may not have information about the services being provided to the user equipment or a location in which those services are being provided absent that information being provided to it by the core network. Hence, when a brand entity makes a determination that service to a particular user equipment should be stopped, that determination may be made independent of any impact events that may have resulted in the loss of service.

In the depicted example, a Network Provisioning Engine (NPE) node 114 manages interactions between a number of brand entities 302 (1-N) partnering with a network (e.g., a cellular network) as well as a number of service providers 304 (1-M) configured to provide particular services to a user equipment operating on a network. For example, the brand entities 302 (1-N) and the service providers 304 (1-M) may include an MNO and/or one or more MVNOs.

Typically, a NPE node 114 may be responsible for provisioning and deprovisioning (e.g., activating and deactivating) services to be provided to various user equipment. When an account is created to provide access to user equipment for a particular brand entity 302, a network provisioning catalog 306 is queried to identify a number of services (corresponding to service providers 304) that should be provided to the user equipment. The NPE node 114 then "provisions" the services by providing information to each of the respective service providers to cause them to provide those services.

The NPE node 114 may manage whether services are provided to a particular user equipment by providing instructions to the various service providers 304 to cause them to provide services or cease providing services. As noted elsewhere, the NPE node 114 may provide such instructions in response to information received from a brand entity 302 that manages an account associated with the user equipment.

In embodiments, the NPE node 114 may be in communication with a location helper 308 configured to apply a flag to, or generate a list of, user equipment impacted by an impact event associated with a location. As described in greater detail elsewhere, the location helper may, upon receiving information about an impact event, identify a number of user equipment that are determined to be potentially impacted by that impact event. If the NPE node 114 receives instructions to activate or deactivate a service in relation to a user equipment that has been determined to be potentially impacted by that impact event, the NPE node 114 may prevent that activation/deactivation.

Figure 4:
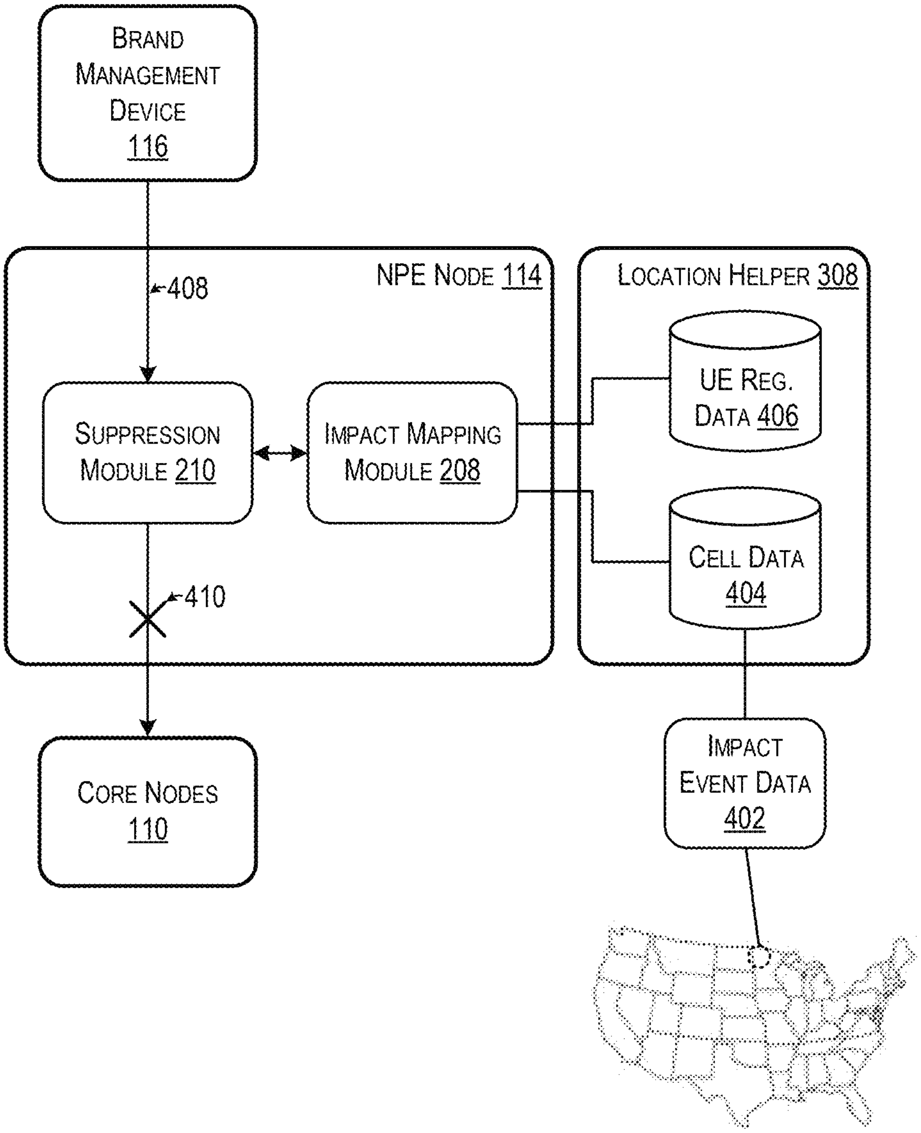
FIG. 4 depicts a block diagram illustrating a process for suppressing deactivation notifications in accordance with embodiments.

FIG. 4 depicts a block diagram illustrating a process for suppressing deactivation notifications in accordance with embodiments. As noted elsewhere, a NPE node 114 may manage interactions between a brand management device 116 and a number of core nodes 110 that provide services associated with a network.

As noted elsewhere, the NPE node 114 may include software components such as a suppression module 210 and/or an impact mapping module 208 as described in relation to FIG. 2 above. Additionally, the NPE node 114 may be in communication with a location helper 308 as described in relation to FIG. 3 above.

In embodiments, impact event data 402 may be received that indicates at least an area or region that has been impacted by an impact event. The impact event data 402 may also include a date and/or time at which the impact event occurred. In some cases, the impact event data 402 may include an indication of a type or category associated with the impact event as well as a period of time over which the impact event is expected to be relevant.

Upon receiving impact event data 402, the impact mapping module 208 may query the location helper 308 for cell data 404 to identify a number of cell sites that lie within, or proximate to, the area or region as indicated in the impact event data 402. Notably, the cell data 404 may include a mapping of cell sites (as identified via a unique base station identifier) to a physical location or region.

Once a list of relevant cell sites has been generated in this manner, the location helper may identify a number of user equipment that have potentially been impacted by the impact event. To do this, the impact mapping module 208 may query a database of user equipment registration data 406 to identify user equipment that have been connected to the cell sites on the identified list of cell sites. In some cases, the user equipment may be identified as being potentially impacted by the impact event by virtue of the user equipment having accessed an identified cell site within a period of time around i.e., in close proximity to, the time that the impact event occurred. For example, the period of time around the time that the impact event occurred may include a first predetermined time interval before a time duration of the impact event occurrence, a second predetermined time interval that corresponds to the time duration of the impact event occurrence, and/or a third time interval after the time duration of the impact event occurrence. In some cases, the user equipment may be identified as being potentially impacted by the impact event by virtue of the user equipment having last accessed an identified cell site (e.g., no additional cell sites were accessed by the user equipment after accessing the cell site).

Once a number of user equipment have been identified as having potentially been impacted by the impact event, that user equipment may be flagged. In some cases, a data value associated with the user equipment may be updated to reflect that the user equipment has been identified as having potentially been impacted by the impact event. In some cases, an identifier associated with the user equipment is added to a list of identifiers that is associated with the impact event.

In operation, the NPE node 114 may receive a notification 408 to deactivate a user equipment. For example, the brand management device 116 may provide such a notification upon determining that an account associated with the user equipment is delinquent (e.g., a bill has not been paid). In this example, the brand management device 116 may provide the notification 408 to the NPE node 114 to cause the network to cease providing services to the user equipment.

Upon receiving the notification 408, the suppression module 210 may make a determination as to whether the user equipment is indicated as being impacted by an impact event. If the user equipment is determined to not currently be impacted by the impact event (e.g., it is not flagged or included on a list of impacted user equipment), then the suppression module 210 may send a deactivation notification 410 to the core nodes 110. If, however, the user equipment is determined to be currently impacted by an impact event, then the suppression module 210 may suppress the deactivation notification 410. In either case, the suppression module 210 may report a successful deactivation to the brand management device 116.

Figure 5:
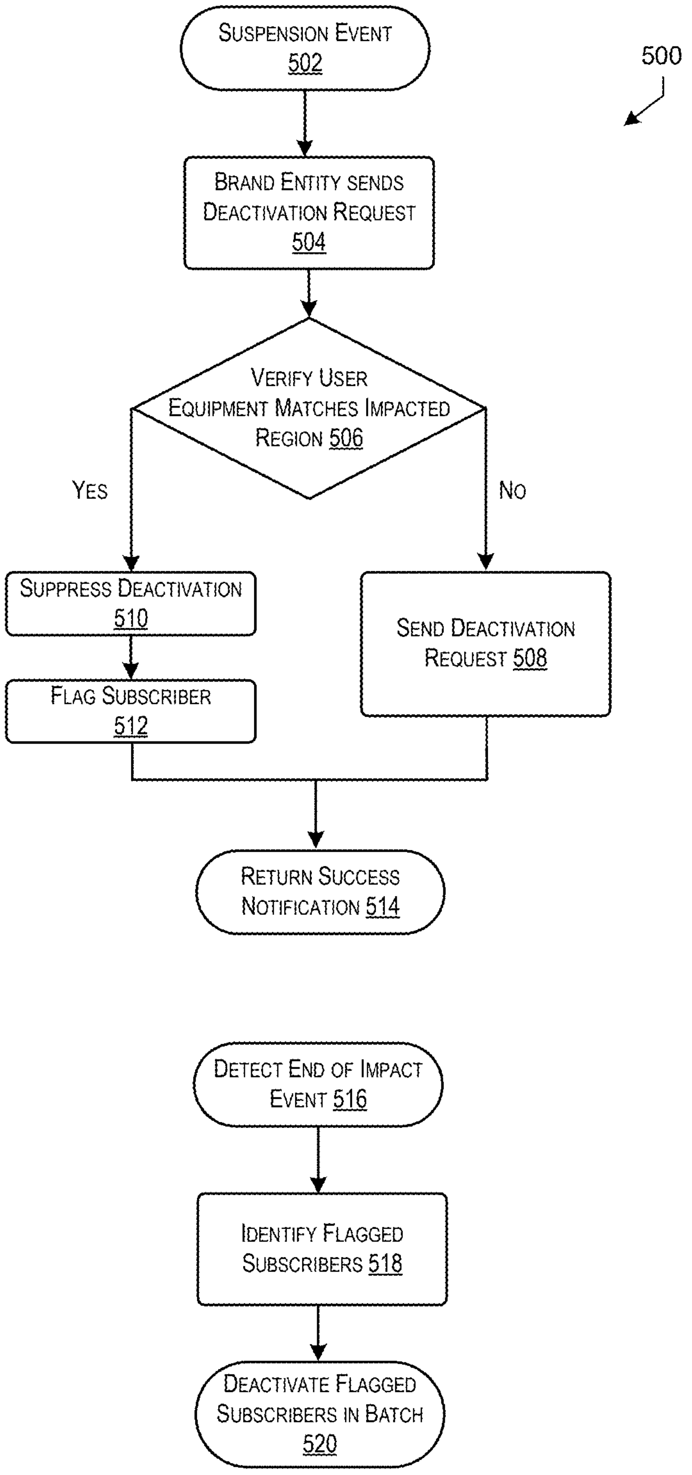
FIG. 5 depicts a flow chart illustrating a process for suppressing deactivation notifications in accordance with embodiments.

FIG. 5 depicts a flow chart illustrating a process for suppressing deactivation notifications in accordance with embodiments. The process 500 may be performed by a node device operating within a network (e.g., a cellular network), such as the NPE node 114 as described in relation to FIG. 1 above.

At 502, the process 500 may involve determining that a suspension event has occurred. In some cases, this may involve determining that an account associated with a subscriber of a user equipment has had an outstanding balance for more than a predetermined amount of time. In some cases, this may involve determining that a resource associated with the account has been depleted. For example, in the event that the account is a pre-paid account, a deactivation event may occur when the account has been depleted of prepaid network usage time, such as "minutes."

At 504, in response to the suspension event, the brand entity associated with the account for the user equipment provides a deactivation request to the network. That deactivation request is received within the network by a NPE node as described elsewhere.

At 506, the process 500 may involve making a determination as to whether the user equipment associated with the deactivation request matches (e.g., was located within or in proximity to) the impacted region or not. As noted elsewhere, this may involve identifying a set of gateway devices (e.g., base stations) located within, or proximate to, the geographic region associated with the impact event and then identifying a set of user equipment that has accessed those gateway devices at a time proximate to that of the occurrence of the impact event.

Upon making a determination that the user equipment is not associated with the impacted region (e.g., "No" at 506), the NPE node sends the deactivation request to the core nodes of the network at 508. Upon receiving the deactivation request, the core nodes of the network may cease providing services to the user equipment.

Upon making a determination that the user equipment is associated with the impacted region (e.g., "Yes" at 506), the NPE node may suppress the deactivation request at 510. This may involve simply not forwarding the deactivation request to the core nodes in order to prevent services to stop being provided to the user equipment. In addition to suppressing the deactivation request, the NPE node may flag the user equipment and/or a subscriber account associated with the user equipment as being impacted by the impact event at 512. In some cases, such a flag may include an indication of (e.g., an identifier for) the impact event that affects the user equipment.

Regardless of whether the sending of the deactivation request by the NPE node to the core nodes is suppressed or not, the NPE node may report a success notification to the brand entity at 514 in order to prevent recurrence of the issuance of the deactivation request.

In some cases, the NPE node may subsequently receive a reactivation request related to the user equipment. For example, the brand entity may make a determination that the subscriber account associated with the user equipment has been made current. In such cases, the NPE node may, upon determining that the user equipment to be reactivated is flagged as being impacted by the impact event, also suppress the reactivation request. In some cases, upon receiving the reactivation request, the NPE node may unflag the user equipment so that it is no longer indicated as being impacted by the impact event.

At 516, the process 500 may involve detecting that the impact event has come to an end. In some cases, this may involve a predetermined amount of time associated with the impact event having elapsed. In some cases, this may involve a restoration of services (e.g., power being restored, cellular services being restored, etc.) being detected. In some cases, a user or administrator may provide an indication that the impact event has ended.

At 518, the process 500 may involve identifying user equipment that has been flagged as being impacted by the impact event. In some cases, the user equipment may be identified by virtue of being included on a list of user equipment previously identified (e.g., at 506) as being impacted by the impact event. Additionally, the NPE node may identify user equipment for which a reactivation request was not previously received. Upon generating the list of user equipment that is no longer impacted by the impact event, the NPE node may send a deactivation request for each of the user equipment in that list to the core nodes of the network in order to initiate stopping of services to be provided to the user equipment at 520. In some cases, such a request may be sent as a batch notification.

Figure 6:
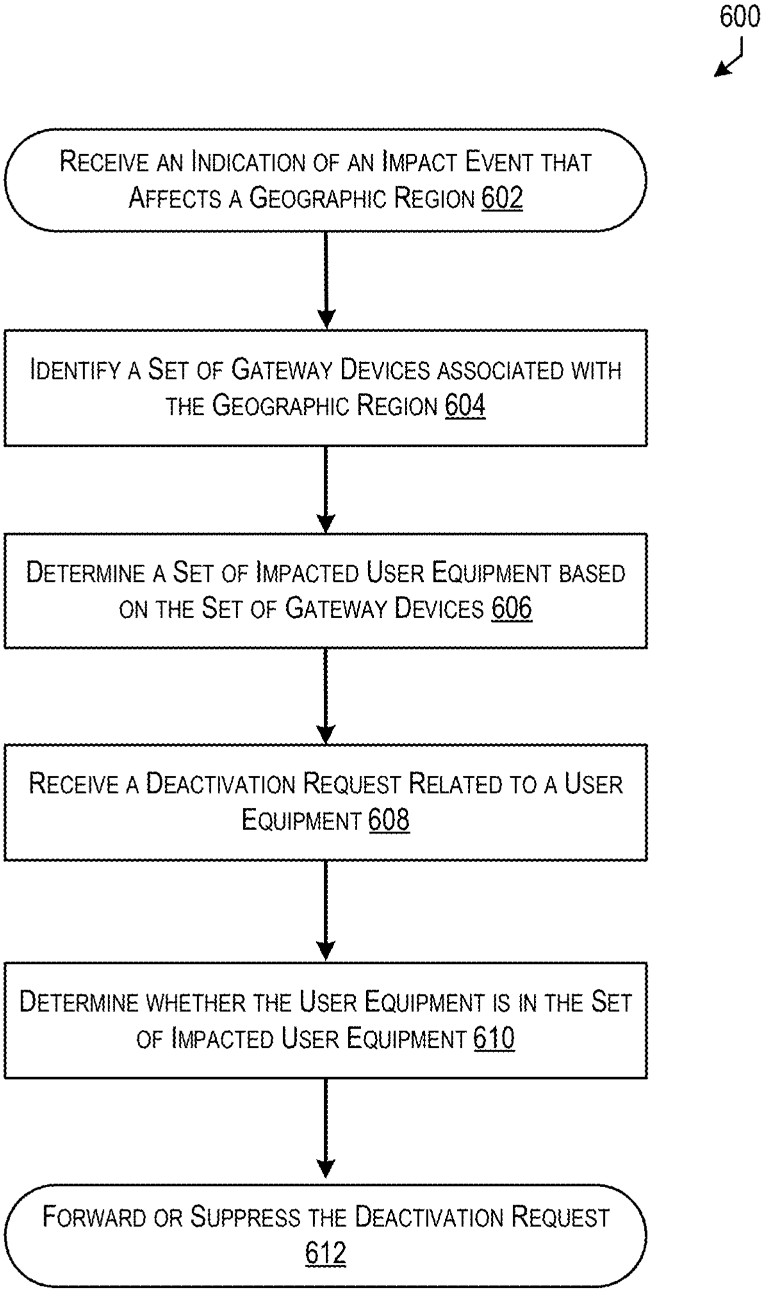
FIG. 6 depicts a flow diagram illustrating an exemplary process for providing automatic suppression of deactivation notification for user equipment affected by an impact event in accordance with at least some embodiments.

FIG. 6 depicts a flow diagram illustrating an exemplary process for providing automatic suppression of deactivation notification for user equipment affected by an impact event in accordance with at least some embodiments. The process 600 may be performed by a node device operating within a network (e.g., a cellular network), such as the NPE node 114 as described in relation to FIG. 1 above. The NPE node may be in communication with a core node that provides services to user equipment operating on the network. As noted elsewhere, the user equipment may be a mobile device that operates using a network connection, such as a cellular phone.

At 602, the process 600 may involve receiving an indication of an impact event that affects a geographic region. As noted elsewhere, an impact event may include any event during which one or more capabilities are limited for people within the geographic region. In some cases, an impact event may include the occurrence of a natural disaster, such as a tornado, an earthquake, a hurricane, or a fire. In some cases, an impact event may include an occurrence of a technological failure, such as a power or internet outage in a region. In some cases, the geographic region includes an area within a predetermined radius of an epicenter for the impact event.

At 604, the process 600 may involve identifying a set of gateway devices associated with the geographic region. In embodiments, the set of gateway devices may be base stations configured to provide connectivity to a cellular network. In embodiments, the set of gateway devices is identified based on locations associated with the set of gateway devices in relation to the geographic region. For example, the set of gateway device may include base stations located within, or in close proximity to, the geographic region.

At 606, the process 600 may involve determining a set of impacted user equipment based on the set of gateway devices 606. In embodiments, the set of impacted user equipment is determined based on detected interactions between the user equipment in the set of impacted user equipment and the set of gateway devices. For example, the user equipment may be determined to be impacted if it interacted with (e.g., accessed) one or more of the gateway devices in the set of gateway devices at a time in close proximity to the occurrence of the impact event.

At 608, the process 600 may involve receiving a deactivation request related to a user equipment 610. In embodiments, the deactivation request may be received from a brand management device operated in relation to a brand entity. For example, the brand management device may manage an account associated with the user equipment. In this example, the deactivation request may relate to an indication that the account has an outstanding balance (e.g., the subscriber has not paid his or her bill).

At 610, the process 600 may involve making a determination as to whether the user equipment is in the set of impacted user equipment. In some embodiments, the user equipment is determined to be in the set of impacted user equipment based on a flag value associated with the user equipment. In some embodiments, the user equipment is determined to be in the set of impacted user equipment based on a list of identifiers for the set of impacted user equipment.

At 612, the process 600 may involve either suppressing the deactivation request or forwarding it to one or more core nodes. For example, upon determining that the user equipment is not in the set of impacted user equipment, the process 600 may involve forwarding the deactivation request to one or more core node. Upon determining that the user equipment is in the set of impacted user equipment, however, the process 600 may involve suppressing the deactivation request. Regardless of whether the deactivation request is suppressed or forwarded, the process 600 may further involve responding to the brand management device with a success notification (e.g., with a message indicating that the services have been deactivated).

Figure 7:
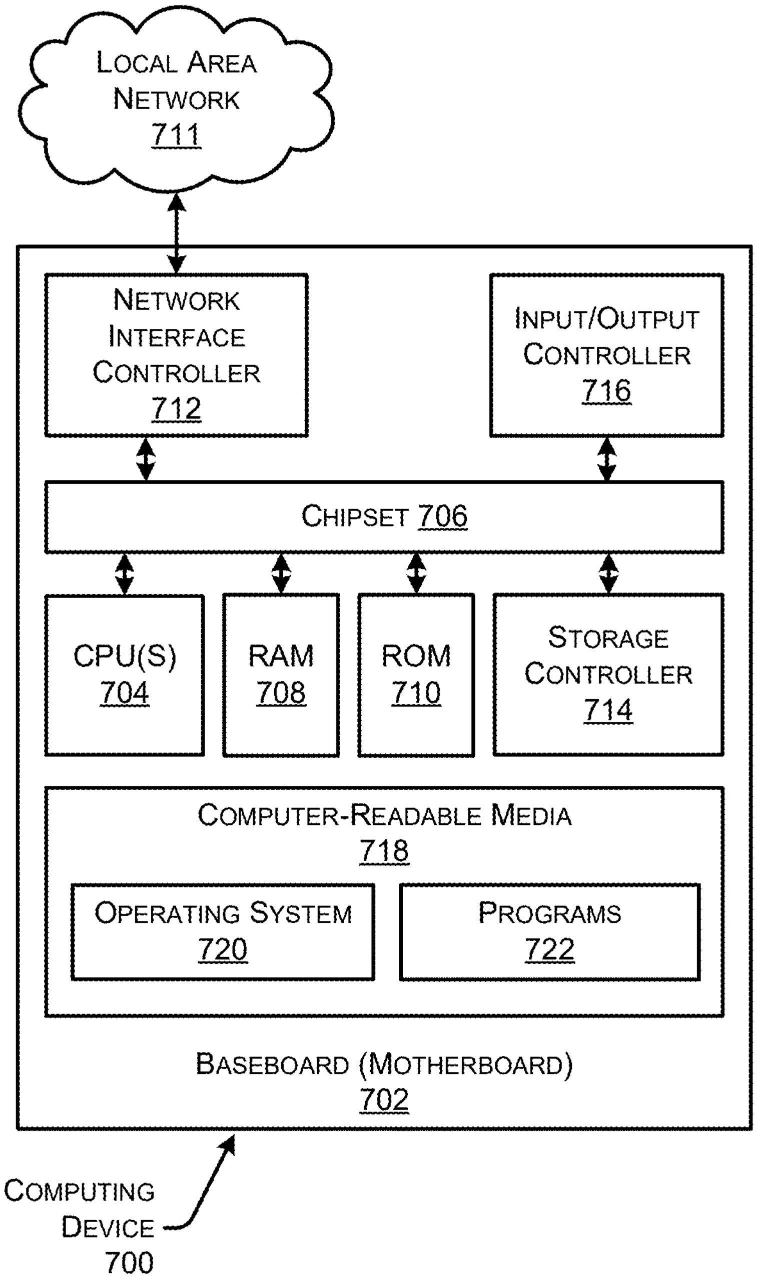
FIG. 7 shows an example computer architecture for a computing device capable of executing program components for implementing the functionality described above.

FIG. 7 shows an example computer architecture for a computing device 700 capable of executing program components for implementing the functionality described above. Such a computing device 700 may be implemented as user device (e.g., user equipment 102) or as network node (e.g., NPE node 114) as described herein. The computer architecture shown in FIG. 7 illustrates a conventional server computer, workstation, desktop computer, laptop, tablet, network appliance, e-reader, smartphone, or other computing device, and can be utilized to execute any of the software components presented herein. The computing device 700 may, in some examples, correspond to a physical server as described herein, and may comprise networked devices such as servers, switches, routers, hubs, bridges, gateways, modems, repeaters, access points, etc.

The computing device 700 includes a baseboard 702, or "motherboard," which is a printed circuit board to which a multitude of components or devices can be connected by way of a system bus or other electrical communication paths. In one illustrative configuration, one or more central processing units ("CPUs") referred to as processors 704 operate in conjunction with a chipset 706. The processors 704 can be standard programmable processors that perform arithmetic and logical operations necessary for the operation of the computing device 700.

The processors 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the processors 704 and the remainder of the components and devices on the baseboard 702. The chipset 706 can provide an interface to a RAM 708, used as the main memory in the computing device 700. The chipset 706 can further provide an interface to a computer-readable storage medium such as a read-only memory ("ROM") 710 or non-volatile RAM ("NVRAM") for storing basic routines that help to startup the computing device 700 and to transfer information between the various components and devices. The ROM 710 or NVRAM can also store other software components necessary for the operation of the computing device 700 in accordance with the configurations described herein.

The computing device 700 can operate in a networked environment using logical connections to remote computing devices and computer systems through a network, such as the network 711. The chipset 706 can include functionality for providing network connectivity through a NIC 712, such as a gigabit Ethernet adapter. The NIC 712 is capable of connecting the computing device 700 to other computing devices over the network 711. It should be appreciated that multiple NICs 712 can be present in the computing device 700, connecting the computer to other types of networks and remote computer systems.

The computing device 700 can be connected to a storage device 718 that provides non-volatile storage for the computer. The storage device 718 can store an operating system 720, programs 722, and data, which have been described in greater detail herein. The storage device 718 can be connected to the computing device 700 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computing device 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 can further read information from the storage device 718 by detecting the physical states or characteristics of one or more particular locations within the physical storage units.

In addition to the mass storage device 718 described above, the computing device 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 700. In some examples, the operations performed by devices as described herein may be supported by one or more devices similar to computing device 700. Stated otherwise, some or all of the operations performed by an edge device, and/or any components included therein, may be performed by one or more computing device 700 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computing device 700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 718 can store other system or application programs and data utilized by the computing device 700.

In one embodiment, the storage device 718 or other computer-readable storage media is encoded with computer-executable instructions which, when loaded into the computing device 700, transform the computer from a general-purpose computing system into a special-purpose computer capable of implementing the embodiments described herein. These computer-executable instructions transform the computing device 700 by specifying how the CPUs (e.g., processors 704) transition between states, as described above. According to one embodiment, the computing device 700 has access to computer-readable storage media storing computer-executable instructions which, when executed by the computing device 700, perform the various processes described above with regard to the other figures. The computing device 700 can also include computer-readable storage media having instructions stored thereupon for performing any of the other computer-implemented operations described herein.

The computing device 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computing device 700 might not include all of the components shown in FIG. 7, can include other components that are not explicitly shown in FIG. 7, or might utilize an architecture completely different than that shown in FIG. 7.

As described herein, the computing device 700 may include one or more hardware processors 704 (processors) configured to execute one or more stored instructions. The processors 704 may comprise one or more cores. Further, the computing device 700 may include one or more network interfaces configured to provide communications between the computing device 700 and other devices, such as the communications described herein as being performed by an edge device. The network interfaces may include devices configured to couple to personal area networks (PANs), wired and wireless local area networks (LANs), wired and wireless wide area networks (WANs), and so forth. More specifically, the network interfaces include the mechanical, electrical, and signaling circuitry for communicating data over physical links coupled to the network 711. The network interfaces may be configured to transmit and/or receive data using a variety of different communication protocols. Notably, a physical network interface may also be used to implement one or more virtual network interfaces, such as for virtual private network (VPN) access, known to those skilled in the art. In one example, the network interfaces may include devices compatible with Ethernet, Wi-Fi™, and so forth.

The programs 722 may comprise any type of programs or processes to perform the techniques described in this disclosure. The programs 722 may comprise any type of program that cause the computing device 700 to perform techniques for communicating with other devices using any type of protocol or standard usable for determining connectivity.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing module contains computer executable instructions executed by the processor to perform functions provided by one or more routing protocols. These functions may, on capable devices, be configured to manage a routing/forwarding table (a data structure) containing, e.g., data used to make routing forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (i.e., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing module may implement a process that consists solely of providing mechanisms necessary for source routing techniques. That is, for source routing, other devices in the network can tell the less capable devices exactly where to send the packets, and the less capable devices simply forward the packets as directed.

In various embodiments, as detailed further below, one or more module executed on the computing device 700 may also include computer executable instructions that, when executed by processor(s), cause computing device 700 to perform the techniques described herein. To do so, in some embodiments, a module may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, one or more module included on the computing device 700 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as normal or anomalous. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that path evaluation process can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted an undesirable behavior of a path, such as its delay, packet loss, and/or jitter exceeding one or more thresholds. Conversely, the false negatives of the model may refer to the number of times the model incorrectly predicted acceptable path behavior. True negatives and positives may refer to the number of times the model correctly predicted whether the behavior of the path will be acceptable or unacceptable, respectively. Related to these measurements are the concepts of recall and precision. Generally, recall refers to the ratio of true positives to the sum of true positives and false negatives, which quantifies the sensitivity of the model. Similarly, precision refers to the ratio of true positives to the sum of true and false positives.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

Although the descriptions provided herein may be in the context of certain radio access technologies, networks, and network topologies, such as 5G/NR mobile communications, the proposed concepts, schemes, and any variations thereof may be implemented in, for and by other types of radio access technologies, networks, and network topologies. Such radio access technologies, networks, and network topologies may include, for example and without limitation, Long-Term Evolution (LTE), Internet-of-Things (IoT), Narrow Band Internet of Things (NB-IoT), vehicle-to-everything (V2X), fixed wireless internet, and non-terrestrial network (NTN) communications. Thus, the scope of the disclosure is not limited to the examples described herein.

What is claimed is:

1. A method comprising:
- receiving, at a Network Provisioning Engine (NPE) node, an indication of an impact event that affects a geographic region;
- identifying, by the NPE node, a set of gateway devices associated with the geographic region;
- determining, by the NPE node, a set of impacted user equipment based on the set of gateway devices;
- receiving, at the NPE node, a deactivation request related to a user equipment; and
- upon determining, by the NPE node, that the user equipment is in the set of impacted user equipment, suppressing the deactivation request.

2. The method of claim 1, wherein the deactivation request is received from a brand management device operated in relation to a brand entity.

3. The method of claim 2, wherein the brand management device manages an account associated with the user equipment.

4. The method of claim 3, wherein the deactivation request relates to an indication that the account has an outstanding balance.

5. The method of claim 1, wherein the set of gateway devices comprise base stations configured to provide connectivity to a cellular network.

6. The method of claim 1, wherein the set of gateway devices is identified based on locations associated with the set of gateway devices in relation to the geographic region.

7. The method of claim 1, wherein the set of impacted user equipment is determined based on detected interactions between the set of impacted user equipment and the set of gateway devices.

8. The method of claim 1, wherein the impact event comprises an event during which one or more capabilities are limited for people within the geographic region.

9. The method of claim 1, further comprising upon determining, by the NPE node, that the user equipment is not in the set of impacted user equipment, forwarding the deactivation request to one or more core node.

10. A Network Provisioning Engine (NPE) node implemented in a network comprising:
- one or more processors; and
- one or more non-transitory computer-readable media storing computer-executable instructions that, when executed by the one or more processors, cause the NPE node to perform operations comprising:
  - receiving an indication of an impact event that affects a geographic region;
  - identifying a set of gateway devices associated with the geographic region;
  - determining a set of impacted user equipment based on the set of gateway devices;
  - receiving a deactivation request related to a user equipment; and
  - upon determining that the user equipment is in the set of impacted user equipment, suppressing the deactivation request.

11. The NPE node of claim 10, wherein the operations further comprise responding to the deactivation request with a success notification.

12. The NPE node of claim 10, wherein the deactivation request is received in relation to a brand entity that manages an account associated with the user equipment.

13. The NPE node of claim 12, wherein the deactivation request relates to an indication that the account has an outstanding balance.

14. The NPE node of claim 10, wherein the set of gateway devices comprise base stations configured to provide connectivity to a cellular network.

15. The NPE node of claim 10, wherein the set of gateway devices is identified based on locations associated with the set of gateway devices in relation to the geographic region.

16. The NPE node of claim 10, wherein the set of impacted user equipment is determined based on detected interactions between the set of impacted user equipment and the set of gateway devices.

17. A system comprising:
- at least one core node; and
- a Network Provisioning Engine (NPE) node configured to:
  - receive an indication of an impact event that affects a geographic region;
  - identify a set of gateway devices associated with the geographic region;
  - determine a set of impacted user equipment based on the set of gateway devices;
  - receive a deactivation request related to a user equipment; and
  - upon determining, by the NPE node, that the user equipment is in the set of impacted user equipment, suppress the deactivation request.

18. The system of claim 17, wherein the user equipment is determined to be in the set of impacted user equipment based on a flag value associated with the user equipment.

19. The system of claim 17, wherein the user equipment is determined to be in the set of impacted user equipment based on a list of identifiers for the set of impacted user equipment.

20. The system of claim 17, wherein the geographic region comprises an area within a predetermined radius of an epicenter for the impact event.

* * * * *